July 6, 1965 C. M. EINHORN 3,193,157
APPARATUS FOR SPREADING POWDERED AND GRANULAR MATERIALS
Filed Aug. 20, 1962 3 Sheets-Sheet 1

INVENTOR.
CLARENCE M. EINHORN
BY
Carl C. Batz
ATT'Y.

July 6, 1965 C. M. EINHORN 3,193,157
APPARATUS FOR SPREADING POWDERED AND GRANULAR MATERIALS
Filed Aug. 20, 1962 3 Sheets-Sheet 2

INVENTOR.
CLARENCE M. EINHORN
BY Carl C. Batz
ATT'Y.

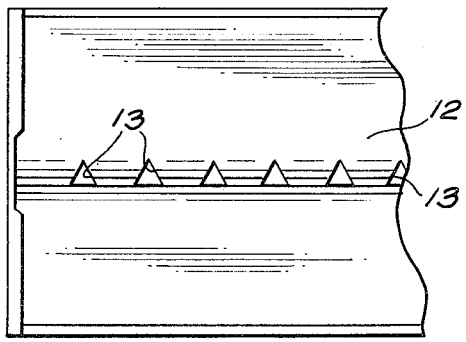
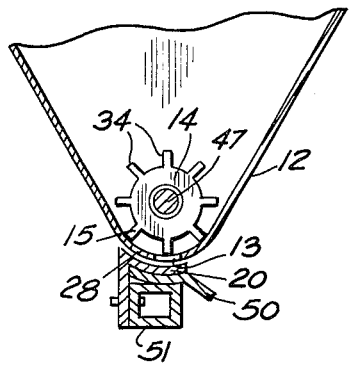
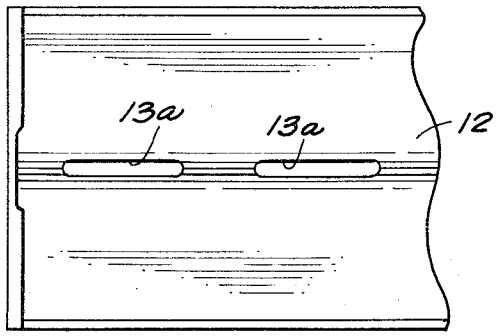
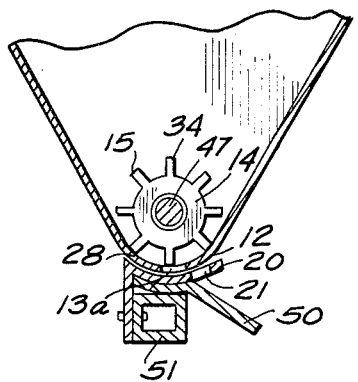
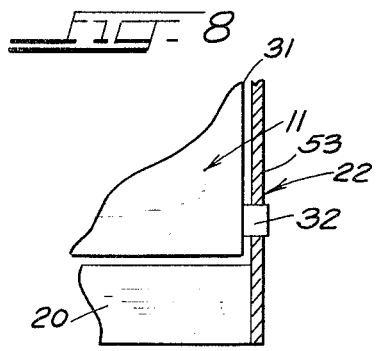
INVENTOR.
CLARENCE M. EINHORN

United States Patent Office 3,193,157
Patented July 6, 1965

3,193,157
APPARATUS FOR SPREADING POWDERED AND GRANULAR MATERIALS
Clarence M. Einhorn, Atlanta, Ga., assignor to Armour and Company, Chicago, Ill., a corporation of Delaware
Filed Aug. 20, 1962, Ser. No. 218,014
6 Claims. (Cl. 222—311)

This invention relates to devices for distributing powdered or granular materials, and it particularly relates to devices for distributing pesticides, fertilizer, grass seed, lime, etc.

In recent years with the large increase in the number of home owners, there has been a corresponding increase in the market for lawn tools. Among the most necessary and commonly used of lawn tools are distributors or spreaders for pesticides, fertilizer, grass seed, lime, etc. Although there are a number of different types of distributors available, most have significant shortcomings.

One serious drawback of many distributors is that there is no convenient way for the operator to shut off the flow of material. When crossing a sidewalk or driveway or when stopping in the middle of the lawn, the operator must close off the flow by moving a lever. Under such circumstances, it would be advantageous if the passage of material could be stopped automatically, without the necessity of moving a lever.

Another common problem occurs when the operator pivots the spreader on one wheel. In most spreaders, the agitator in the hopper is operated by one of the ground wheels, the drive wheel. If the spreader is pivoted on its free wheel, the drive wheel moves in a wide arc and causes material to flow. Since the pivot wheel moves very little in relation to the drive wheel, an excessive amount of material is distributed in the area near the pivot wheel. It would be highly desirable if such uneven distribution could be avoided when the spreader is pivoted on one wheel, without operating a shut-off mechanism.

Another serious fault is that it is quite difficult to provide a constant feed-rate. Fertilizers are ordinarily mixtures of fine and coarse materials, and known spreaders have openings which are insufficient to allow the passage of large particles at moderately low rates of application. So, as the distribution of fertilizer progresses, the proportion of coarse particles to fine particles increases and this reduces the rate of material flowing from the hopper. It would be a great advantage, if a more constant flow of both coarse and fine materials would be provided.

Another disadvantage of most spreaders is that they are relatively awkward to push. The reason is that spreaders have only two wheels, so the operator must carry some of the weight of the spreader and the material. Also, the agitator that is positioned in the hopper, is usually attached to the drive wheel. This causes the agitator to move far more material past the openings of the spreader than actually passes through to the lawn. By moving a large amount of material unnecessarily, there is not only excessive resistance to moving the spreader, but also excessive wear of the hopper. It would be highly desirable if pushing the spreader were made easier and if hopper wear could be minimized.

Therefore, it is a principal object of this invention to alleviate the aforementioned disadvantages of known fertilizer spreaders.

It is also an object of this invention to provide a distributor which substantially stops the flow of product when the distributor stops moving.

It is another object of this invention to provide a distributing device which substantially stops the flow of product when the distributor is moving over an area which does not require the application of various materials.

It is a further object of this invention to provide a fertilizer distributing device which feeds at a relatively constant rate.

It is still another object of this invention to provide a distributing device which is relatively easy to push.

It is still a further object of this invention to provide a distributor which reduces excessive wearing of the hopper.

Further purposes and objects of the present invention will appear as the specification proceeds.

The accompanying drawings illustrate a preferred embodiment of the present invention wherein:

FIG. 4 is a partial top plan view of the hopper of the embodiment of FIG. 1, but without the agitator;

FIG. 5 is a partially broken enlarged sectional view taken along line 4—4 of FIG. 2;

FIG. 6 is a view, similar to FIG. 3, showing alternate openings in the hopper;

FIG. 7 is a view, similar to FIG. 4, showing the embodiment of FIG. 5 used in conjunction with an alternate distributor plate; and FIG. 8 is a partially broken detail view of the distributor plate being rotatably attached to the hopper.

Figure 1:
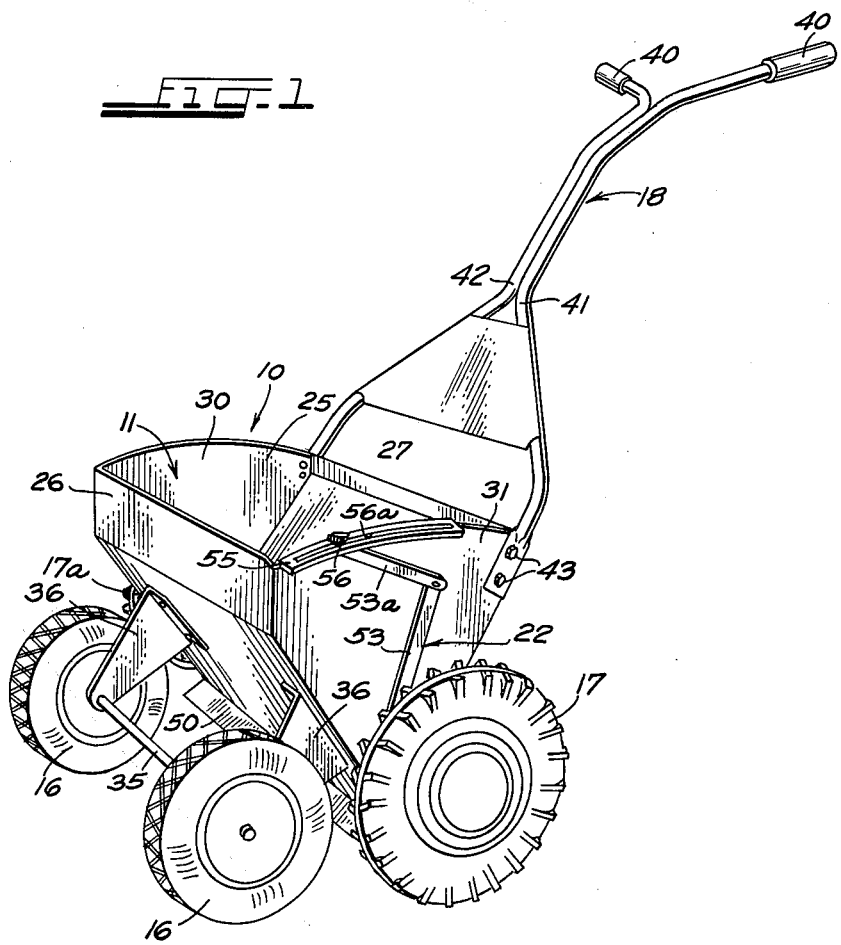
FIG. 1 is a perspective view of the distributor of the present invention.
Figure 2:
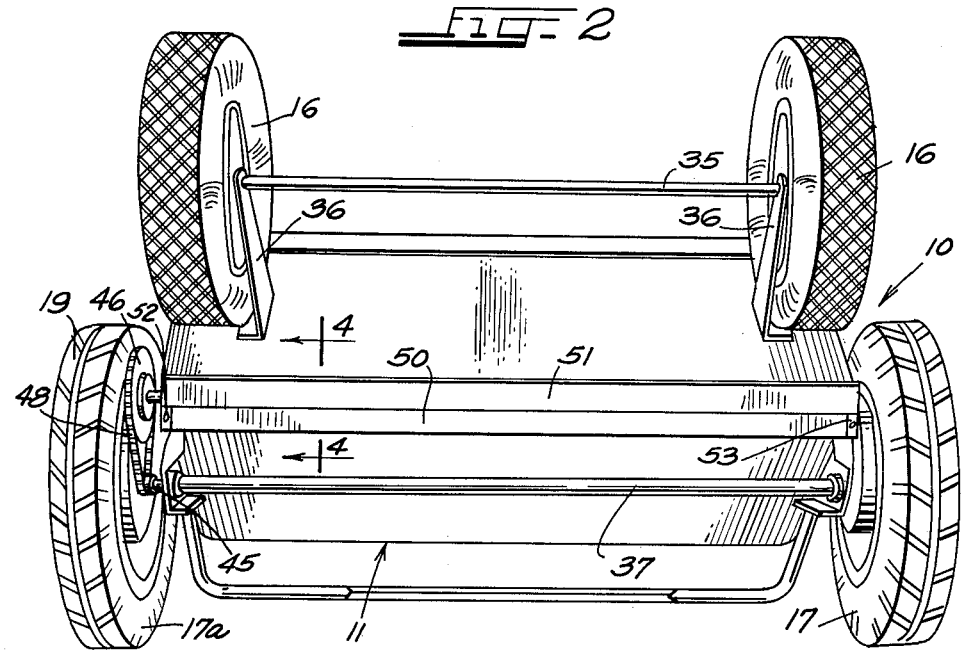
FIG. 2 is a bottom view of the embodiment of FIG. 1.
Figure 3:
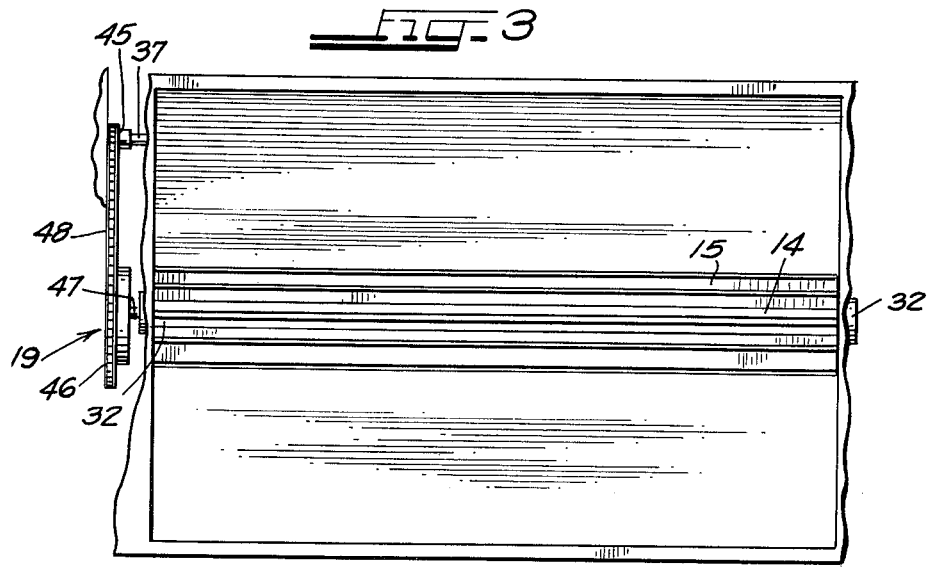
FIG. 3 is a partially broken, top plan view of the embodiment of FIG. 1.

Generally, the distributor 10 for spreading powdered or granular materials comprises a hopper 11 having a bottom 12 with openings 13, four wheels 16 and 17 rotatably mounted on the hopper 11, an agitator 14 having a plurality of blades 15, the agitator 14 being rotatably mounted within the hopper 11 above the openings 13, means 19 for transmitting the rotation from at least one of the wheels 16 and 17, as 17a, to the agitator 14 at a reduced rate of rotation, a distributor plate 20 movably mounted beneath the openings 13, and means 22 mounted on said hopper for adjusting and locking the distributor plate 20 in position for a desired rate of material distribution.

The hopper 11 has a large rectangular opening 25 for receiving material, a front side 26 and a rear side 27 which converge together and form a rounded apex 28 at the bottom 12 of the hopper 11. The hopper 11 is also provided with a first side 30 and a second side 31 which are attached to sides 26 and 27. Openings 13 are provided in the bottom 28 of the hopper 11 and may be of any desired shape. Advantageously, openings 13 are in the shape of triangles 13 as shown in FIG. 4 or are in the shape of elongated slots 13a as shown in FIG. 5. The openings are of sufficient size to allow the coarsest of fertilizer materials to pass through, while at the same time the openings are spaced so that there is not an excessive flow of material.

Secured to the sides 30 and 31 of the hopper 11 is the handle 18 which is provided with suitable hand grips 40. The handle 18 may be constructed in any desirable manner, but is conveniently provided with tubular members 41 and 42, which are adjustably mounted on the hopper 11 by fasteners 43.

The agitator 14 is positioned above openings 13 and desirably includes ten flexible blades 15. The agitator 14 is rotatably mounted in the hopper 11, as in bearings 32. The extremities 34 of blades 15 are desirably positioned in close proximity to the hopper 11 in order to substantially eliminate the flow of material through the space between the extremities 34 and the hopper 11. The agitator 14 is preferably molded rubber, not only for convenience of manufacture, but also because rubber blades 15 substantially eliminate wearing of the hopper 11 caused by interference between hopper 11 and blades 15.

The spreader 10 is provided with four wheels 16 and 17. Front wheels 16 are rotatably mounted on a shaft or axle 35 which is mounted on brackets 36, which are in turn fixedly secured to front side 26 of hopper 11. The rear wheels 17 are attached to the shaft or axle 37 which is rotatably secured to the hopper 11 in bearings. Preferably one of the wheels 17, as 17a, is fixedly secured to the shaft 37 and the other wheel 17 is rotatably mounted on the shaft 37. Thus, wheel 17a becomes a drive wheel and causes rotation of shaft 37 and the other wheel 17 becomes an idler wheel.

The transmission means 19 for driving the agitator 14 includes a first sprocket 45 which is fixed to shaft 37, a second sprocket 46 which is fixed to agitator shaft 47, and a chain 48 which meshes with sprockets 45 and 46. It is desirable that the rotational speed of the agitator 14 be less than that of the axle 37, and preferably at a 2:1 ratio. As drive wheel 17a rotates, sprocket 45 rotates and this rotation is transmitted to sprocket 46, shaft 47 and ultimately to agitator 14 since the shaft 47 is secured to agitator 14.

The distributor plate 20 is movably positioned beneath and in close proximity to slots 13. When openings 13 are in the shape of triangles, as shown in FIG. 4, the plate has no openings, as shown in FIG. 5. In contrast, when openings 13 are in the shape of elongated slots, as shown in FIG. 6, the plate 20 has triangular openings 21. In ordinary usage, when the slots 13a in the hopper 11 co-operate with a distributor plate 20 having triangular openings 21 and when the triangular openings 13 in the hopper 11 co-operate with a distributor plate 20 having no openings, both arangements accomplish substantially the same type of material distribution. However, when the hopper 11 has slots 13a, the plate 20 may be removed and the distributor will be adaptable to spreading an extremely heavy application of material, such as required for spreading topsoil. Such a heavy application would not be possible if the hopper had only a plurality of triangular openings 13. Again, it is highly desirable that the openings 21 be of such a size that they pass the coarsest of materials while being spaced so that there will not be an excessive flow of material. It has been found that, when the openings 21 are about ⅝" equilateral triangle spaced on 1½" centers, excellent results are obtained.

It has been found that it is desirable to provide a scatterboard 50 beneath openings 13 and openings 21, so that the material falling from the hopper 11 strikes the scatterboard 50 and then fans out in order to provide a more even distribution. The scatterboard is ordinarily positioned at an acute angle to openings 13 and 21 in a downward direction and opposite to the normal forward movement of the distributor or towards the handle 18.

The scatterboard 50 and distributor plate 20 are secured to a bar 51, which in turn is secured by suitable fasteners to hanger 52 and adjusting bar 53, each of which is in turn pivotly mounted on hopper 11 on agitator bearings 32. Adjusting bar 53 is hingedly attached to bar 53a, which in turn is hingedly attached to locking member or bolt 56. The desired opening for openings 13 is determined by moving bars 53 and 53a to various positions along calibration plate 55 which is fixed to the upper part of side 31 of hopper 11. Locking bolt 56 passes through slot 56a of plate 55 and is tightened on plate 55 when the desired setting is reached. As bolt 56 is moved backward or forward, hanger 52 and bar 53 pivot on bearings 32 causing bar 51 to move, thereby aligning distributor plate 20 or openings 21 with hopper 11 for the desired flow of material.

Although the operation of the improved distributor should be apparent from the above description, it is believed that some of the unexpected advantages of the present invention should be set forth. The above described apparatus fulfills the previously mentioned objects and overcomes many drawbacks of prior art distributors.

As an example, after the hopper 11 has been filled with material and the proper adjustment between hopper opening 13 and plate 20 have been made, the operator pushes the spreader 10 for distributing materials on the desired area. With the structure provided by the present invention, there is a more constant feed rate of both coarse and fine materials at moderate rates of application since the triangular openings 13 or 21 are sufficiently large to pass the coarsest of materials and yet there is not an excessive flow of material in view of the rather wide separation between openings 13 or 21. So by this measure, the present invention surprisingly overcomes one of the serious drawbacks of known spreaders.

Another problem overcome by the present spreader is that when the agitator stops rotating, there is no continuous fall through of material, in view of the close proximity between the extremities 34 of the blades 15 and hopper 11 and further, by providing flexible blades 15, there is a minimum problem of excessive wear caused by interference between the blades 15 and the hopper 11.

The problem of excessive wear is also reduced by gearing down the rotational speed of the agitator, thereby substantially reducing the quantity of material unnecessarily moved past openings 13.

In providing front idler wheels 16, the present spreader may be pivoted upward and moved only on front wheels 16 as the operator is crossing a driveway or a sidewalk. Since the spreader 10 is moving on wheels 16, the agitator 14 does not move and there is no flow of material. So in having front idler wheels, one of the serious disadvantages of the prior art devices is overcome. Also, in moving the spreader 10 on only front wheels 16, there is no uneven distribution of material when the spreader 10 is turned.

Further, in providing four wheels, the weight is evenly distributed and the operator is not required to carry any of the weight of the material or the spreader 10. Further, the spreader 10 is easier to push in reducing the speed of the agitator 14 to a speed rate whereby only a minimum quantity of material is carried past openings 13. Again, serious objections to prior spreading devices are overcome by the present invention.

While in the foregoing specification there has been a detailed description of the present invention, it is to be understood that all equivalents obvious to those skilled in the art are to be included within the scope of the invention as claimed.

I claim:

1. An apparatus for spreading powdered and granular materials including in combination, a hopper having walls and means at the bottom for distributing said materials, an agitator means rotatable about its longitudinal axis and mounted in said hopper above said distributing means, and a chamber defined by the lower hopper walls and the agitator means when the latter is in a stationary position, said chamber being interposed between said hopper and said distributing means and serving to interrupt the flow of material when rotation of the agitator means ceases.

2. The structure of claim 1 wherein the distributing means at the bottom of the hopper includes an opening through which the materials fall during rotation of the agitator means.

3. The structure of claim 1 wherein the distributing means at the bottom of the hopper includes in combination, an opening and a distributor plate to regulate the rate of material distribution.

4. The structure of claim 1 wherein said agitator means includes an agitator rotatably mounted about its longitudinal axis in said hopper above said distributing means, said agitator having solid flexible blades radiating from said longitudinal axis.

5. The structure of claim 4 wherein said solid flexible blades radiating from the longitudinal axis of said agitator are continuous for the length of said agitator.

6. The structure of claim 5 wherein said chamber is formed by the continuous solid flexible blades of said agitator and the lower walls of said hopper to prevent the flow of material into said chamber when rotation of the agitator ceases.

References Cited by the Examiner

UNITED STATES PATENTS

| | | | |
|---|---|---|---|
| 2,141,691 | 12/38 | Kirby | 222—177 X |
| 2,178,320 | 10/39 | Bogumill. | |
| 2,180,253 | 11/39 | Moore | 275—14 |
| 2,605,935 | 8/52 | Huitema | 222—177 |
| 2,710,116 | 6/55 | Juzwiak | 222—177 |
| 2,735,582 | 2/56 | Wilson | 222—485 X |
| 2,784,880 | 3/57 | Pio | 222—177 |

LOUIS J. DEMBO, *Primary Examiner.*

RAPHAEL M. LUPO, *Examiner.*